April 9, 1929.   J. W. WELSH   1,708,200
OPHTHALMIC MOUNTING
Filed May 21, 1925
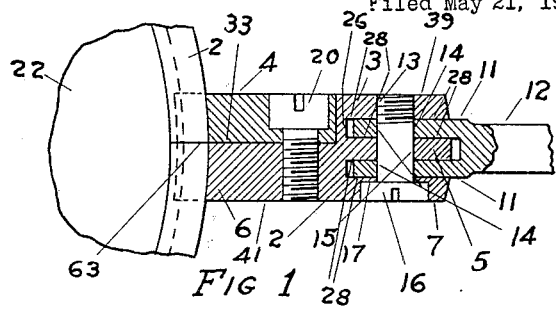
FIG 1
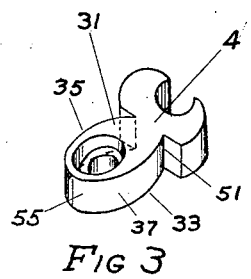
FIG 3
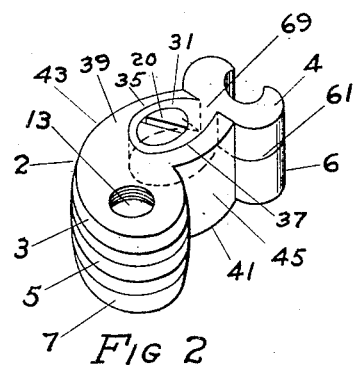
FIG 2
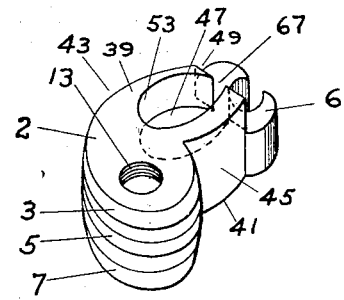
FIG 4
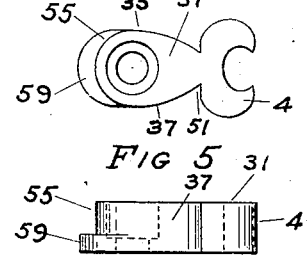
FIG 5
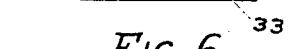
FIG 6
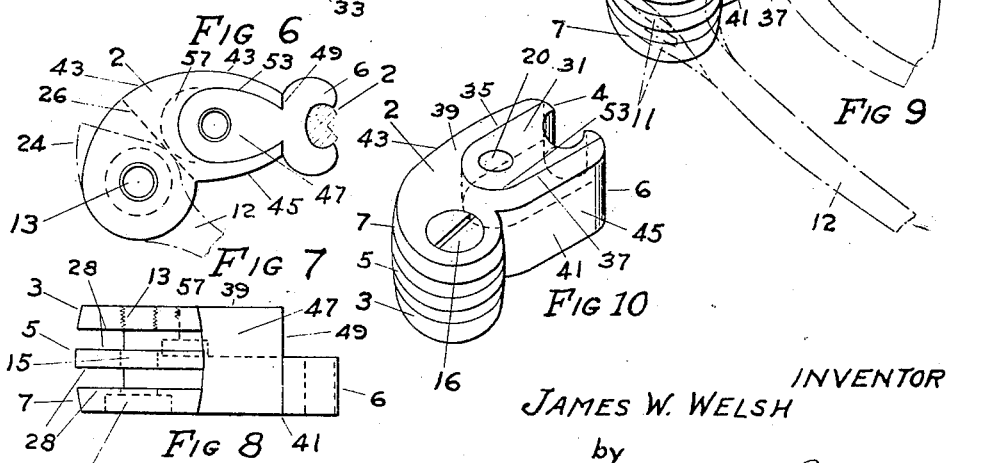
FIG 7   FIG 10
FIG 8   FIG 9
INVENTOR
JAMES W. WELSH
by David Rines
ATTORNEY Patented Apr. 9, 1929.

1,708,200

UNITED STATES PATENT OFFICE.

JAMES WILSON WELSH, OF PROVIDENCE, RHODE ISLAND, ASSIGNOR TO BAUSCH AND LOMB OPTICAL COMPANY, OF ROCHESTER, NEW YORK, A CORPORATION OF NEW YORK.

OPHTHALMIC MOUNTING.

Application filed May 21, 1925. Serial No. 31,740.

The present invention relates to ophthalmic mountings, and more particularly to double-ear temples and temple connections for spectacles.

Single-ear temples are mounted in place by simply pivoting the ear of the temple between two ears provided upon one or more end pieces,—one end piece in mountings of the rimless type and two separate end pieces in mountings having split, lens-holding rims. Temples having a plurality of ears are not so easily manipulated, particularly with mountings of the split-rim type. One of the advantages of a double-ear temple is the increased bearing surface provided by the additional temple ear; and it is not easy to design split-rim end pieces provided with sufficient bearing surface to cooperate efficiently with the bearing surfaces of the temple ears. Split-rim end pieces, furthermore, have a tendency to loosen, thereby weakening the tension upon the cooperating bearing surfaces of the temple and the end-piece ears.

It is therefore an object of the present invention to improve upon ophthalmic mountings of the above-described character. Other and further objects will be explained hereinafter and will be particularly pointed out in the appended claims.

With these ends in view, a feature of the invention contemplates a novel, double-ear, temple joint that shall be cheap to manufacture, rugged, simple, attractive, and not easily loosened, but of such nature that the temple may be pivoted to one only of the split-rim end pieces. The difficulties attendant upon the use of multiple-ear temples in split joints are thus eliminated, and a superior joint is nevertheless provided.

With these and other objects in view, the nature of which will appear hereinafter, the invention consists of the improved ophthalmic mounting hereinafter described, illustrated in the accompanying drawings, and defined in the appended claims.

In the accompanying drawings, Fig. 1 is a fragmentary section taken longitudinally through the end pieces and the temple of a pair of spectacles constructed according to a preferred embodiment of the present invention; Fig. 2 is a perspective view of the said end pieces, assembled; Figs. 3 and 4 are similar views, respectively, of the end pieces shown in Fig. 2, detached; Fig. 5 is a plan of a modification of the end piece shown in Fig. 3; Fig. 6 is an elevation of the same; Fig. 7 is a plan of a modification of the end piece shown in Fig. 4, adapted to cooperate with the end piece illustrated in Figs. 5 and 6; Fig. 8 is an elevation of the same; Fig. 9 is a view, corresponding to Fig. 2, showing the end pieces of Figs. 5 to 8 in assembled relation, and showing also, in phantom, portions of a split lens-holding rim to which the end pieces are secured and of a temple pivoted to the end pieces; and Fig. 10 is a view similar to Fig. 2 of a further modification.

The illustrated temple 12 is provided with two flattened pivot ears 11, each provided with an eye 14. The split, lens-holding rim 2 is provided with end pieces 4 and 6, the latter of which is longer than the other and is provided with three end-piece ears, 3, 5 and 7. The ear 3 is provided with a threaded eye 13 and the ears 5 and 7 with unthreaded eyes 15 and 17, the latter of which is countersunk. The temple ears 11 are inserted between adjacent end-piece ears 3, 5 and 7, the end-piece ears and the temple ears becoming thus alternately disposed. The temple is then pivotally secured in place upon the end piece 6 by a screw or other pintle 16 that extends through the eyes 13, 14, 15 and 17. The screw 16 is provided with an enlarged head that is seated in the countersunk eye 17, and with a terminally threaded portion that is threaded in the eye 13. If desired, a bearing sleeve (not shown) may be slipped on the screw 16, but the temple may pivot about the screw itself as a bearing. To remove the temple, or to remount it, all that is necessary is to manipulate the screw 16. The pivotal movement of the temple is limited by projecting points 24 provided upon the ears 11 and adapted to engage limiting walls 26 that are provided between the ears 3, 5 and 7 of the end piece 6. During such pivotal movement, the bearing faces of the temple ears 11 bear frictionally against the bearing faces 28 of the end-piece ears 3, 5 and 7. In order that the bearing faces 28 may contact smoothly with, and press with uniform tension upon, the bearing faces of the temple ears 11, the thickness of the temple ears 11 should be equal to, or very slightly less than, the distance between the end-piece ears. So constructed, the temple will not swing loosely. It will remain in any position that it may happen to occupy, but it is readily freely movable to any other position between its limits of movement.

The ends pieces 4 and 6 are secured together by a screw 20 to maintain a lens 22 in position within the split rim. The end piece 4 is provided with an outer face 31, an inner face 33, and two side faces 35 and 37, connecting the faces 31 and 33. An end face 55 joins the side faces 35 and 37. The end piece 6 is similarly provided with an outer face 39, an inner face 41, and two side faces 43 and 45, connecting the faces 39 and 41. The longer end piece 6 is recessed at 47 between the side faces 43 and 45. The recess 47 extends from the face 39, part way through the thickness of the end piece, but not transversely across the end piece from the side face 43 to the side face 45. The side faces 43 and 45 are thus unmarred by the longitudinally disposed split that is customarily found in split-rim, end-piece joints. If desired, this split may be wholly eliminated, as illustrated in Fig. 10. In the preferred construction of the present invention, however, the split is partly visible at 61, near the junction of the end pieces with the ends of the split rim 2.

The shorter end piece 4 is equal in length to the length of the recess 47, and is so shaped as to be received in the recess. The side and end walls 53 of the recess are so shaped as to interlock with the side faces 35 and 37 and the end face 55 to prevent relative twisting of the end pieces 4 and 6. To this end, the mouth 67 of the recess 47 is made narrower than the maximum width of the recess and the end piece 4 is correspondingly made narrower at 69 than the maximum width of the end piece 4, so as to interlock with the walls of the recess. The danger that would otherwise exist of chipping the lens 22 at the junction 63 between the end pieces is eliminated.

Additional interlocking means for preventing twisting may be provided in a socket 57 provided in the wall 53 of the recess 47, in which is received a finger 59 extending from the end face 55 longitudinally of the end piece 4, as illustrated in Figs. 5 to 9, inclusive.

Modifications within the spirit of the invention will obviously occur to persons skilled in the art, and all such are intended to be included within the scope of the appended claims.

What is claimed is:

1. An ophthalmic mounting having, in combination, two end pieces each having an outer face, an inner face and two side faces connecting the outer and the inner faces, one of the end pieces being recessed between its side faces, the recess being provided with a mouth that is narrower than the maximum width of the recess, the other end piece being shaped to interlock with the wall of the recess to prevent relative twisting of the end pieces, and means for securing the end pieces together.

2. An ophthalmic mounting having, in combination, two end pieces each having an outer face, an inner face and two side faces connecting the outer and the inner faces, one of the end pieces being recessed between its side faces, the recess being provided with a mouth that is narrower than the maximum width of the recess, the other end piece being shaped to interlock with the wall of the recess and the end pieces being provided with additional interlocking means to prevent relative twisting of the end pieces, and means for securing the end pieces together.

3. An ophthalmic mounting having, in combination, two end pieces each having an outer face, an inner face and two side faces connecting the outer and the inner faces, one of the end pieces being recessed between its side faces, the recess being provided with a mouth that is narrower than the maximum width of the recess, the other end piece being shaped to interlock with the wall of the recess, and one of the end pieces being provided with a socket and the other end piece with a finger seated in the socket to prevent relative twisting of the end pieces, and means for securing the end pieces together.

4. An ophthalmic mounting having, in combination, a split lens rim having two end pieces of different lengths, the longer end piece having an outer face, an inner face, and two side faces connecting the outer and the inner faces, the longer end piece being recessed between its side faces, the recess being provided with a mouth that is narrower than the maximum width of the recess, the other end piece being shaped to interlock with the wall of the recess to prevent relative twisting of the end pieces, means for securing the end pieces together, the longer end piece being provided with more than two ears, and a temple provided with one ear less than the number of end-piece ears, the temple ears and the end-piece ears being alternately disposed, and a pintle extending through the temple ears and the end-piece ears, whereby the temple is pivoted to the longer end piece.

5. An ophthalmic mounting having, in combination, a split lens rim having two end pieces of different lengths, the longer end piece having an outer face, an inner face, and two side faces connecting the outer and the inner faces, the longer end piece being recessed between its side faces, the recess being provided with a mouth that is narrower than the maximum width of the recess, the other end piece being shaped to interlock with the wall of the recess, one of the end pieces being provided with a socket and the other end piece with a finger seated in the socket to prevent relative twisting of the end pieces, means for securing the end pieces together, the longer end piece being provided with more than two ears, and a temple provided with one ear less than the number of end-piece ears, the temple ears and the end-piece ears being alternately disposed, and a pintle extending through the temple ears and the end-piece ears, whereby the temple is pivoted to the longer end piece.

In testimony whereof, I have hereunto subscribed my name.

JAMES W. WELSH.